May 29, 1923.

E. G. LEHMAN 1,457,039

FASTENING DEVICE

Filed April 25, 1921

Inventor
Edward G. Lehman
By Day, Oberlin & Day
Attorneys

Patented May 29, 1923.

1,457,039

UNITED STATES PATENT OFFICE.

EDWARD G. LEHMAN, OF CANTON, OHIO.

FASTENING DEVICE.

Application filed April 25, 1921. Serial No. 464,316.

*To all whom it may concern:*

Be it known that I, EDWARD G. LEHMAN, a citizen of the United States, and a resident of Canton, county of Stark, and State of Ohio, have invented a new and useful Improvement in Fastening Devices, of which the following is a specification, the principle of the invention being herein explained and the best mode in which I have contemplated applying that principle, so as to distinguish it from other inventions.

In sheet metal construction considerable difficulty is encountered in providing any simple form of fastening means whereby two or more sheets may be secured together, or a single sheet attached to a framework. Ordinarily bolts with slotted heads, and provided with nuts on the order of stove bolts are employed, as for example, in assembling sheet metal cabinets, bins and other furniture, as well as in the construction of door and window moldings and other building elements made of sheet metal.

The object of the present invention is to provide an aperture in a metal sheet forming a component of structures such as those above referred to whereby a bolt or set screw may be directly threaded into such aperture in the same fashion as it might be threaded into a nut. The use of nuts is thus entirely done away with, and by reason of the unique form of the aperture it is rendered unnecessary to cut threads in the wall or edge surrounding the same, while at the same time an unusually strong fastening is obtained.

To the accomplishment of the foregoing and related ends, said invention, then, consists of the means hereinafter fully described and particularly pointed out in the claim, the annexed drawing setting forth in detail certain mechanism embodying the invention, such disclosed means constituting, however, but one of various mechanical forms in which the principle of the invention may be used.

In said annexed drawing:—

Figure 4:
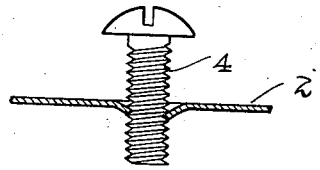
Figure 1:
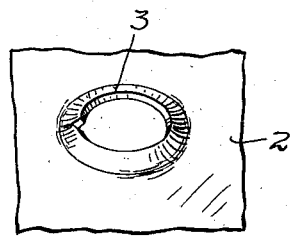
Figure 2:
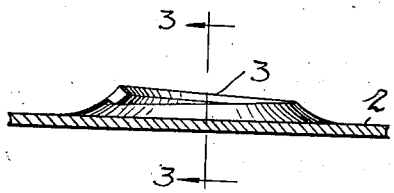
Figure 3:
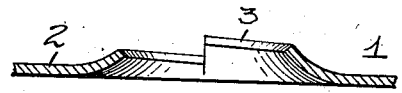

Fig. 1 is a perspective view of a broken piece of sheet metal, in which an aperture designed for engagement with a screw has been formed in accordance with my invention; Fig. 2 is a side elevation of such sheet on a somewhat enlarged scale; Fig. 3 is a transverse section thereof taken on the plane indicated by the line 3—3, Fig. 2; Fig. 4 is a similar section showing a screw in engagement with the aperture; and Fig. 5 is a plan view showing the aperture in a preliminary stage of formation.

Figure 5:
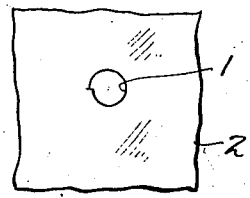

As indicated in Fig. 5, the hole or aperture 1, as initially formed in the sheet 2, is approximately spiral in outline, and as shown in Fig. 1, when completed, the edge 3 of the sheet bounding such aperture is displaced transversely of the plane of the sheet so as to bring such edge into a corresponding plane with a helix of the proper pitch to receive a screw 4 of predetermined diameter and pitch, as shown in Fig. 4. Incidentally to the displacement of the material forming such edge 3 the latter is bent so as to present one corner of the edge at the proper angle to engage the hollow between the threads of the screw.

It will be understood that the formation of the aperture 1 and the upsetting, so to speak, of its edge to form an internal screw thread in the fashion just described, will, in practice, be accomplished by a single operation through the use of suitably designed male and female dies.

The resulting fastening presents unusual strength and rigidity, particularly where the bolt or screw is entered from the concave side, as shown in Fig. 4, since the effect of increased tension on the screw is to draw the edges of the apertures into closer engagement with the threads on such screw.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a device of the character described, a sheet formed with an aperture adapted to engage a screw-threaded bolt or the like, the edge of such aperture being displaced to one side of the plane of the sheet so as to lie on a helix corresponding with the thread on such bolt, and being bent to present one corner of such edge for engagement with such thread.

Signed by me, this 22 day of April, 1921.

EDWARD G. LEHMAN.